(12) United States Patent
Long

(10) Patent No.: US 8,759,251 B2
(45) Date of Patent: Jun. 24, 2014

(54) CAPTURE, CONTROL OR REMOVAL OF NUTRIENT LADEN EFFLUENT, RUN-OFF OR AGRICULTURAL, INDUSTRIAL, COMMERCIAL OR DOMESTIC WASTE FLOW

(76) Inventor: Tom Long, Swan View (AU)

( * ) Notice: Subject to any disclaimer, the term of this patent is extended or adjusted under 35 U.S.C. 154(b) by 0 days.

(21) Appl. No.: 13/485,927

(22) Filed: Jun. 1, 2012

(65) Prior Publication Data

US 2013/0174622 A1    Jul. 11, 2013

(30) Foreign Application Priority Data

Jun. 1, 2011 (AU) ................................. 2011902134

(51) Int. Cl.
*B01J 20/22* (2006.01)

(52) U.S. Cl.
USPC ........... 502/401; 502/400; 502/406; 502/414; 210/263; 210/670; 210/660

(58) Field of Classification Search
USPC ...................... 502/401, 400, 406, 414; 71/23; 210/660, 263, 210
See application file for complete search history.

(56) References Cited

U.S. PATENT DOCUMENTS

2006/0032807 A1* 2/2006 Sansalone ..................... 210/263

\* cited by examiner

*Primary Examiner* — Colleen Dunn
*Assistant Examiner* — Haytham Soliman

(57) ABSTRACT

A treatment medium has a particulate natural substrate saturated, suffused and/or coated with hydrous iron oxide. The particulate substrate can be wood based, such as wood chips, bark, sawdust, wood waste or other plant material (such as straw, lucerne, hay, coconut husk or other bulk particulate plant material). The hydrous iron oxide is provided in aqueous suspension form. The substrate may be tumbled in aqueous hydrous iron suspension to achieve saturation/coating. The resulting hydrous iron oxide bearing medium is either placed loose directly into the target treatment site or contained in bags 18 before placing into the target site.

15 Claims, 2 Drawing Sheets

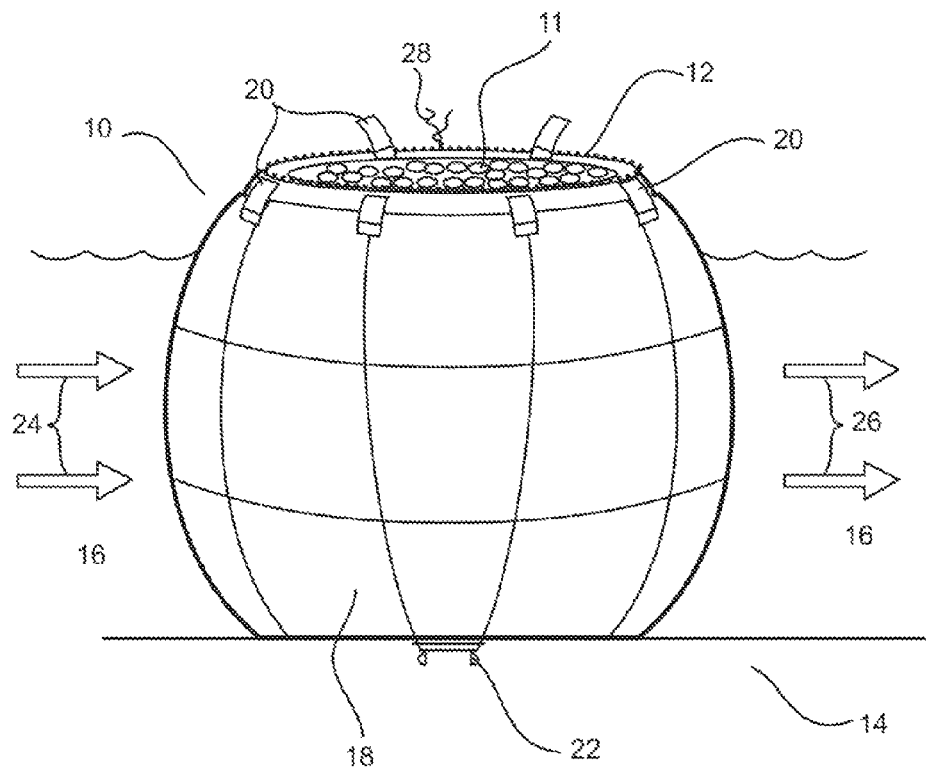
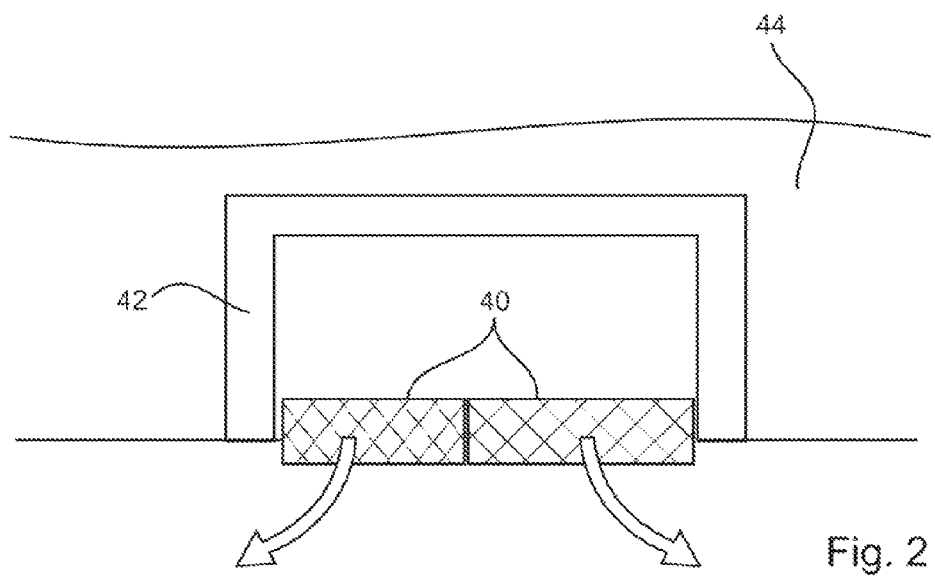

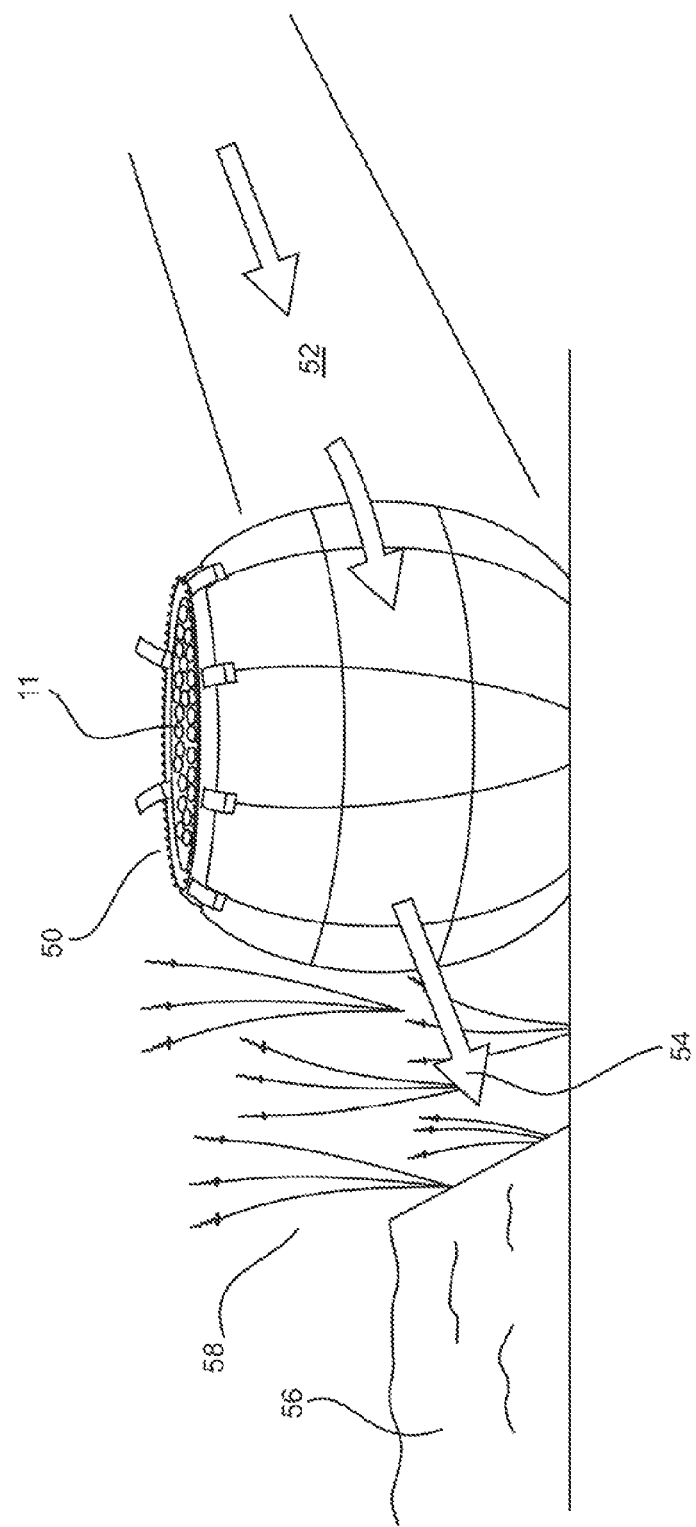

CAPTURE, CONTROL OR REMOVAL OF NUTRIENT LADEN EFFLUENT, RUN-OFF OR AGRICULTURAL, INDUSTRIAL, COMMERCIAL OR DOMESTIC WASTE FLOW

FIELD OF THE INVENTION

The present invention relates to a product, system and method for capture, control or removal of nutrient laden effluent, run-off, sewage treatment and industrial/commercial/domestic waste flow, such as phosphorus and/or nitrogen laden run-off, arising from agricultural and industrial/commercial/domestic operations.

BACKGROUND OF THE INVENTION

Agricultural, commercial and industrial operations create nutrient laden waste, such as from excessive application of commercial fertilisers or in treatment plants/chemical processes. High levels of these nutrients pollute the environment, particularly if they are allowed to enter water courses. In particular, high levels of phosphorus and nitrogen from over use of fertilisers used in agriculture are known to affect water quality. This debilitates animal habitats and bio-diversity by reducing oxygenation in water courses, preventing healthy growth of plants and animals. Excessive algal growth also reduces penetration of light into the water and causes production of sulphides, and also results in socio-environmental impacts such as aesthetics, fouling, odour etc.

It has been recognised that there is a need for a practical treatment media and modality to intercept/recover and remove such nutrients, such as phosphorus and nitrogen already in water courses, or reduce such entering into water courses.

There has previously been some research conducted into using wood chips or other coarse media to physically strain nutrient laden particulates from drainage water. Experiments are known to have been conducted with sawdust placed in trenches to enhance biological denitrification of groundwater.

In the domestic and commercial environment, washing machines and dishwashers pump out water laden with detergent. Many detergents contain phosphorus bearing polyphosphates or phosphate. Although low and no-phosphate detergents have been proposed, in the interim, it would be beneficial to capture such phosphorus in waste water treatment plant effluent or in water courses.

With the aforementioned in mind, it is desirable of the present invention to provide a treatment medium and modality that captures harmful levels of nutrients, particularly phosphorus, in or before they reach water courses.

It is further desirable to provide a medium that creates or promotes conditions for biological denitrification of waste flows before waste water enters water courses.

SUMMARY OF THE INVENTION

With the aforementioned in view, one form of the present invention provides a water treatment medium including a substrate including at least one adsorption agent retained in or on the substrate.

Preferably the substrate is saturated or coated with a solution containing the at least one adsorption agent.

The solution may have the at least one adsorption agent dissolved and/or suspended therein.

Preferably the at least one adsorption agent includes hydrous iron oxide; hydrous aluminium oxide or calcium carbonate, or a combination of two or more thereof.

The present invention can be utilised in dealing with removal of both soluble and particulate forms of nutrients.

The at least one adsorption agent, such as hydrous iron oxide, hydrous aluminium oxide and/or calcium carbonate acts as an active water treatment component to adsorb phosphorus from the water.

The substrate may include wood chips, bark chips, a plant based mulch, straw, hay or other lignocellulose/carbon based materials, or combinations of any thereof.

The media may be retained in a container, such as a flexible bag. The container may incorporate a material porous to the nutrient laden water and/or the container may have apertures to allow through flow of the water.

The media may accomplish its treatment function through one or more mechanisms:

Phosphorus in the water is exposed to adsorption forces at the surfaces of hydrous aluminium/iron oxide component;

The media may physically strain particulates carried in the water;

The media may depress oxygen concentrations to create anoxic conditions when in the presence of carbon (such as a carbon based substrate or added carbon material), thereby promoting biological denitrification The media promotes the biological assimilation of nitrogen and phosphorus The container may include a bulk material carrying bag having one or more of a duffle top opening (such as for receiving the media into the bag and drawing together the top "duffle" to close the container), ventilated side(s) to facilitate flow of water through the filter media, and a throated bottom for release of the media from the container. This facilitates filling and transporting the container, and emptying the expended media.

Where nitrogen removal and/or particulate straining are less of a concern, loose media may be delivered directly into the water or waste flow/reservoir, and the media preferably agitated, to promote take up of phosphorus. Where the media is buoyant in the waste water or water course, the media floats to the surface and can be removed by skimming.

Hydrous iron oxide and other dissolved or adsorbed elements are often put into landfill as a waste material after being removed from ground water by water treatment plants. The present invention proposes to beneficially make use of such disposed hydrous iron oxide and elements capable of adsorbing to reduce environmentally damaging phosphorus and nitrogen. This not only improves environmental conditions but make use of these treatment byproducts to do so. Adoption of the present invention also reduces the surface area needed to evaporate water from hydrous iron oxide removed at water treatment plants.

The bagged media can be readily delivered by local services (local councils and government agencies/contractors) utilising already available equipment. The bagged media may be placed to intercept nutrients in storm water and run off areas.

The present invention also provides passive water quality protection requiring little to no maintenance. The bagged media may be placed where there is a recognised risk of nutrient laden run-off or spillage occurring.

Embodiments of the present invention utilising tree based substrate, such as wood chips or bark chips, make valuable use of wood waste that might otherwise be burnt or buried in landfill sites.

Once expended, the media may be used as nutrient rich mulch for horticultural use.

To create the phosphorus adsorption media, wood chips, bark chips or mulches may be mixed with one or more of aqueous suspensions of hydrous iron oxide, hydrous aluminium oxide or calcium carbonate to achieve saturation and/or coating. The media is then placed in a container, preferably a bulk material handling bag. The bag can facilitate delivery, placing and recovery of the media, such as in inverted box culvert drains. The bag may be craned into place. The duffle top to the bag assists in filling the bag when open and retaining the media when closed.

The hydrous iron oxide rich media substrate may be a particulate material that can be fed loose into the water course or waste flow stream. The media may be agitated during a phosphorus take up period. The media may be recovered by skimming from the surface of the water flow.

Once the phosphorus adsorption capacity is expended, the media may be re-saturated/re-coated and reused. Alternatively, the media may be used as nutrient rich mulch for decorative or horticultural applications.

A method of treating phosphorus laden water, the method including:

a) contacting a substrate including at least one adsorption agent with the phosphorus laden water;

b) adsorbing the phosphorus from the water with the at least one adsorption agent, and c) physically straining phosphorus laden particulates from the flow stream.

Preferably the substrate may be saturated in or coated with hydrous iron oxide, hydrous aluminium oxide, calcium carbonate, and/or other adsorption agents The method may include a prior step of saturating or coating wood chips, bark chips or other lignocellulose or carbon based material as the substrate.

The water treatment may include placing the substrate into a flexible bag for immersion in the nutrient laden water.

Preferably the nutrient includes phosphorus, and may include other non-metallic elements, such as potassium and nitrogen, and metallic elements, such as manganese.

A further form of the present invention provides a horticultural product including a media having a carbon based substrate retaining hydrous iron oxide with adsorbed phosphorus.

The substrate may include wood chips, bark chips, straw, hay, lucerne, coconut husk or other lignocellulose, carbon or plant based material. Thus, the substrate may be a particulate material providing a large surface area for increased contact with the water.

Forms of the present invention may be provided as a ready bagged media of iron oxide bearing carbon based substrate. Preferably the substrate includes wood chips, bark chips or other wood based or lignocellulose based material The container may be ready filled, sealed bag containing the media. The bag may be made of or incorporate natural or synthetic material. Preferably the bag material is a woven material, such as a shade cloth with UV protection properties, to provide a relatively inexpensive container material. Alternatively, the bag material may be a mesh or net material to enhance through-flow of water relative to the hydrous iron oxide, hydrous aluminium oxide and calcium carbonate bearing substrate.

Grade and size of particulate matter forming the substrate may be varied to suit the particular application. Smaller sized particles (e.g. a few millimeters across) may be used to maximise surface area and for smaller bags for low volume/low throughput applications. These smaller bags may be used within smaller drainage culverts/channels and within pipe work. Larger particle sizes (a few centimeters across) may be used for larger volume applications, such as in waterways/watercourses and sewage treatment flows.

One or more forms of the present invention may utilize iron oxide sourced from groundwater treatment residuals.

Such groundwater treatment residuals may contain a significant concentration of naturally occurring phosphorus, which may be derived from phosphorous (P) and iron (Fe) that occur in solution in the same geographical location. Adsorption capability of the iron may already be engaged by pre-existing P.

The coated material can remove a proportion of phosphorous from water if it is in high concentrations, such as treated sewage effluent. A column study showed that woodchips can remove up to 95% of the phosphorous from a high concentration flow.

With low concentrations, there is a risk of the phosphorous desorbing from the woodchips. The present invention addresses this issue as follows. After the chips are coated with iron oxide solution (such as derived from groundwater treatment residuals), they are combined with a weak acid solution to solubilize pre-existing P from the iron oxide coating before deploying the product. This weak acid may have a similar pH to that of soft drink (typically pH 2.5-4.5). The P enriched leachate can be used as a liquid fertiliser applied for agricultural value recovery.

Thus, after the deployed chips lose their effectiveness by no longer being able to absorb more P from the water, the containers holding the chips can be combined with a weak acid to leach the adsorbed P from the coating, then redeploy the containers.

The chip containers can also undergo rejuvenation by another coat of iron oxide solution, which includes the combining in the weak acid (such as dipping the container into a bath of the weak acid) before being redeployed.

This process can occur repeatedly until the media reaches a point of decomposition where water can no longer pass through it effectively at which time media value can be recovered as a useful horticultural product, such as mulch for composting.

BRIEF DESCRIPTION OF THE DRAWINGS

Particular embodiments of the present invention will hereinafter be described, including with reference to accompanying figures. It will be appreciated that the embodiments described do not limit the generality of the present invention.

FIG. 1 shows a product in situ providing bagged bulk medium according to an embodiment of the present invention.

FIG. 2 shows a drainage culvert for channelling run-off, the culvert having therein bagged medium product according to a further embodiment of the present invention.

FIG. 3 shows product in situ providing bagged bulk medium for use in controlling phosphorus entering a waterway according to an embodiment of the present invention

DESCRIPTION OF PREFERRED EMBODIMENTS

A treatment medium is created by saturating, suffusing and/or coating a particulate natural substrate with hydrous iron oxide. The natural substrate may be wood based (such as wood chips, bark, sawdust, wood waste) or other plant material (such as straw, lucerne, hay, coconut husk or other bulk particulate plant material). The hydrous iron oxide is provided in aqueous suspension form. The substrate is soaked in the aqueous suspension of hydrous iron oxide. The substrate may be tumbled in aqueous hydrous iron suspension to achieve saturation/coating. The resulting hydrous iron oxide bearing medium is then either placed loose directly into the target treatment site or contained in bags before placing into the target site. Loose medium may be used where straining of the water to be treated is not required or preferred. With the medium contained bags, the bags may be placed at the treatment site and assist in straining particulates out of the water flow to be treated. Water to be treated may come from agricultural or industrial run-off, such as from fertiliser rich surface run off from farming activities. The bags of medium may preferably be placed in drainage ditches and water course culverts, forcing the water to flow through the bags. Water flow through the particulate medium causes phosphorus within the water to be adsorbed by the presence of the hydrous iron oxide, hydrous aluminium oxide and calcium carbonate. Preferably the bag material is a porous geofabric. The bags of medium strain the water flow and depress oxygen concentration within the stream flow to create anoxic conditions in the presence of the carbon based substrate. This mechanism promotes biological denitrification. Denitrification occurs under anaerobic or anoxic conditions where nitrate in the water flow acts as an electron acceptor in the presence of an organic source of carbon acting as an electron donor.

Where nitrogen removal and particulate straining are not required or are not of primary concern, un-bagged hydrous iron oxide loaded medium may be agitated in the waste flow to promote phosphorus removal. Phosphorus may be present as orthophosphate, polyphosphate or organic forms of phosphorus. The organic carbon based substrate may be buoyant in the waste flow and can then be physically removed by skimming or other removal procedure.

FIG. 1 shows a product 10 according to an embodiment of the present invention. A hydrous iron oxide bearing organic carbon based substrate (wood chips in this example) are contained in a geofabric flexible bag 18. The bag is placed within a waste flow or run-off flow 16 of a culvert or drainage channel 14. It will be appreciated that one or more of such bagged medium may be used, and the location and application selected to suit a particular flow treatment need. The bag has a duffle top with loop tabs 20 allowing the bag to be opened for filling with the medium and then drawn closed by a cord or rope 28 prior to transport or positioning. The bag also has a throated base 22, allowing the bag to be opened to release expended medium prior to the bag being refilled with active medium for reuse. The "duffle" top assists the bag being transported and craned into position. Expended medium may be used as horticultural mulch providing a phosphorus and iron rich organic carbon medium to protect and feed plants. Thus, the waste hydrous iron oxide and organic carbon materials that might otherwise end up in landfill sites are developed into a useful horticultural product and prevent or remove environment debilitating levels of phosphorus (phosphate), and optionally provide denitrification.

FIG. 2 shows an alternative form of product according to a further embodiment of the present invention. Porous bags 40 are placed in a culvert 42 channelling waste flow. It will be appreciated that the bags may be stacked vertically in layers depending on the height of flow through the culvert. Likewise, the bags may be layered horizontally to provide a volume of medium for the waste flow to pass through and react with. Furthermore, the bags may be sized to suit a particular application or to create standard bag sizes. The porous bag material is preferably a geofabric. Alternatively the bag material may be a mesh or netting with apertures smaller than the size of the carbon based substrate contained by the bag.

FIG. 3 shows an application of an embodiment of the present invention. Product container 50 holds the hydrous iron oxide, hydrous aluminium oxide and calcium carbonate bearing medium. Run-off flow 52 from land, such as agricultural run-off containing run-off fertiliser high in phosphorus, into a waterway 56, such as including reed/sedge beds 58, is channelled to flow through the bag 50 to react by adsorption. Outflow 54 from the bag is reduced in phosphorus content. Furthermore, the particulate medium, such as wood chips, bark chips, sawdust contained within the bag also acts to strain particulates carried in the flow 52. This prevents or reduces erosion and also creates anoxic or anaerobic conditions by slowing down waste flow and reducing available oxygen, thereby enhancing denitrification processes through contact with the organic carbon substrate.

It will be appreciated that forms of the present invention combine waste hydrous iron oxide and a source of waste natural carbon, such as wood chips, to create a useful product to control phosphorus entering water courses or within waste water treatment processes, that itself creates a useful horticultural product to be used as mulch and plant food source. Phosphorus laden wood chips with depleted adsorption properties can be used for horticulture or landscaping. Residual iron in the wood chips provides a further mineral source as the wood chips degrade over time. Aqueous suspensions of iron oxides can be sourced as a waste product from iron ore mining operations, such as are prevalent in Western Australia, Africa other countries. Iron ore in suspension can be sourced from "mud pits" used to capture run-off and dewatering water from mining operations. Mud pits are reservoirs of captured iron ore rich water that has either been pumped out of a mine to prevent flooding or is captured as run-off at the mine surface. Hydrous iron oxide suspensions can also be sourced from treatment of acid mine drainage or acid sulphate soils.

The solution may contain one or more dissolved adsorption agents with or without one or more suspended adsorption agents. Hydrous aluminium oxide may be present, or calcium carbonate.

Commercially, the natural carbon substrate can be sourced as a by product of the timber and solid waste industries. Wood chips, bark and sawdust can all be used. The present invention brings together two waste products (hydrous iron oxide and natural carbon waste) and combines them into a useful product for use in reducing phosphorus and nitrogen entering waterways and water courses. The natural carbon source is soaked in the hydrous iron oxide suspension, which can be carried out at elevated temperature and/or pressure to aid the iron oxide particles permeating into the carbon source. The resulting hydrous iron oxide rich medium can then be bagged and delivered to site. The bags are placed in position to intercept wastewater flow such that the waste water is made to contact the natural carbon source, and by adsorption, the hydrous iron oxide layer preferentially captures phosphorus from solution. With the particulate natural carbon source and the bag acting as a strainer, water flow is slowed, thereby creating anoxic conditions (reducing available $O_2$) and promoting denitrification of the wastewater. Depleted medium can be removed and used as decorative and useful mulch for plants, or can be re-soaked in hydrous iron oxide suspensions and reused. The medium may be provided as loose bulk material or may be pre-bagged.

Residues from groundwater treatment are typically disposed of rather than finding commercial or practical use. Composition of these residues vary with geochemical properties of their source. Groundwater treatment plants often have such residuals with high concentrations of hydrous iron and aluminium oxides. The high surface area of these materials and high capacity for sorption of phosphorus has been realized as a potential source for removal of phosphorus and other contaminants in effluents.

Wood chips (such as Karri, Marri, or Jarrah) have been used in developing the present invention. The high organic carbon content of wood chips also provides a mechanism for reducing concentrations of soluble forms of nitrogen.

Under test, laboratory leaching column trials demonstrated that leaching a column of blended woodchip products with a representative sample of waste water produced an eluate characterised by near-neutral pH values and salinity levels comparable with the eluent, although there was a slight re-distribution of the major soluble cations due to ion-exchange reactions.

Effective reduction of soluble phosphorus concentrations has been demonstrated using blended material as sorbent. Under test, phosphorus removal efficiency of 99.8% was achieved with use of fine woodchips. Coarse woodchips achieved a removal efficiency of 64%. Slight reductions in concentrations of soluble nitrogen fractions (ammonium and nitrate nitrogen) and copper were also achieved.

For the experiment, wood chips were sieved into two fractions, either <10 mm "fine" chips or nominally 20 mm "coarse" chips. Both the fine and coarse woodchips were impregnated with the waste water treatment plant residue sludge. A batch of coarse untreated chips was also run through the experiment. The experiment used:
1. a control solution of deionised water only,
2. a sample of "effluent" for the leaching column experiment and
3. a synthetic solution containing a similar concentration of soluble phosphorus, nominally 10 milligrams per liter (mg/L) prepared by dissolving 0.439 grams of (AR) potassium dihydrogen phosphate (KHzP04) in 10 liters of deionised water.

Each of the solutions were then transferred in 10 L containers.

Dry Karri wood chips were manually coated with ground water treatment residual sludge in an approximate ratio of 1:1 by volume. The sludge was concentrated by three days settling and decanting. The coating process required approximately 60 seconds contact followed by a brief draining period to remove excess sludge from the surfaces of the chips. The sludge continued soaking into the chips afterward. The coated chips were then immediately spread on plastic to be sun dried for several days. The chips were raked once daily to speed the drying process. The dried chips were then stored in plastic bags for transport. This drying stage is not deemed necessary but it improved long term storage and handling characteristics of the finished product.

Results from the experiment showed the fine fraction of impregnated woodchips had a high PRI value (380 milliliters per gram), comparable to natural lateritic loamy soils and gypsum amended bauxite residues (such as Alkaloam). The PRI of the coarse woodchip fraction was lower (23 milliliters per gram), but considered suitable for the intended purpose.

Despite the higher phosphorus retention index (PRI) value, the fine woodchip fraction had lower concentrations of iron and manganese compared to the coarse fraction.

Results of the experiment showed that the fine material was very effective at reducing concentrations of phosphorus in effluent, especially the soluble reactive phosphorous (SRP) fraction. Leaching effluent through the fine material resulted in a reduction of SRP from 8.3 milligrams per liter prior to leaching through natural woodchips to 0.02 milligrams per liter after leaching (99.8% removal efficiency). The removal efficiency achieved by the coarse material with untreated effluent was 64%.

The claims defining the invention are as follows:

1. A water treatment medium including a substrate wherein the substrate is selected from the group consisting of Wood chips, bark chips, a plant based mulch, straw, hay or other lignocellulose/carbon based materials, or combinations of any thereof which is saturated with at least one adsorption agent where the adsorption agent is one or more of hydrous iron oxide, hydrous aluminium oxide or calcium carbonate, and the adsorption agent adsorbs phosphorous.

2. A product according to claim 1, wherein the substrate includes a particulate material.

3. A product according to claim 1, wherein the product is a bulk loose material which, in use, is arranged to be put uncontained into the water to be treated.

4. A product according to claim 1, wherein the medium is retained in a container during use 5. A product according to claim 4, wherein the container includes a flexible bag.

6. A product according to claim 4, wherein the container includes a material porous to the nutrient laden water or the container has apertures to allow through flow of the water.

7. A product according to claim 4, wherein the container includes a bulk material bag having one or more of a duffle top opening for receiving the media into the bag and drawing together the top duffle to close the container, ventilated side(s) and a throated bottom for release of the media from the container.

8. A method of treating nutrient laden water by the medium described in claim 1, the method including:
   a) Contacting a substrate saturated in at least one phosphorus adsorption agent with the nutrient laden water over an extended period of time as the substrate decomposes and releases fresh adsorption agent;
   b) Adsorbing the phosphorus from the water with the at least one adsorption agent;
   c) Providing a source of carbon under anoxic conditions to promote biological denitrification, a process well known by those in the waste treatment industry.

9. A method according to claim 8, whereby the substrate is saturated in hydrous iron oxide, hydrous aluminium oxide and/or calcium carbonate.

10. A method according to claim 8, including a step of saturating wood chips, bark chips or other cellulose or carbon based material as the substrate.

11. A method according to claim 9, further including placing the hydrous iron, hydrous aluminium and/or calcium carbonate bearing substrate into a flexible bag for immersion in the nutrient laden water.

12. A method according to claim 9, including, after saturating the substrate with iron oxide solution, combining the substrate with a weak acid solution to solubilize pre-existing phosphorus from the iron oxide.

13. A method according to claim 12, whereby the substrate bearing the iron oxide is contacted with the weak acid solution pH 2.5-45.

14. A method according to claim 12, including collecting the phosphorus bearing solution for use as a liquid fertilizer.

15. A method according to claim 9, including rejuvenating efficacy of the product after use by contacting the substrate with iron oxide solution, including combining in the weak acid.

* * * * *